US009766492B2

(12) United States Patent
Dong et al.

(10) Patent No.: US 9,766,492 B2
(45) Date of Patent: Sep. 19, 2017

(54) LIQUID CRYSTAL DISPLAY HAVING POLARIZATION DEVICE, EYEGLASSES AND DISPLAY APPARATUS

(71) Applicant: BOE TECHNOLOGY GROUP CO., LTD., Beijing (CN)

(72) Inventors: Youmei Dong, Beijing (CN); Wenbo Li, Beijing (CN); Dongsheng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 309 days.

(21) Appl. No.: 14/236,155

(22) PCT Filed: Aug. 22, 2013

(86) PCT No.: PCT/CN2013/082023
§ 371 (c)(1),
(2) Date: Jan. 30, 2014

(87) PCT Pub. No.: WO2014/173049
PCT Pub. Date: Oct. 30, 2014

(65) Prior Publication Data
US 2016/0048055 A1 Feb. 18, 2016

(30) Foreign Application Priority Data
Apr. 22, 2013 (CN) .......................... 2013 1 0139821

(51) Int. Cl.
G02F 1/1335 (2006.01)
G02B 5/30 (2006.01)
(Continued)

(52) U.S. Cl.
CPC ..... *G02F 1/133528* (2013.01); *G02B 5/3058* (2013.01); *G02B 27/28* (2013.01);
(Continued)

(58) Field of Classification Search
CPC ... G02F 1/133528; G02F 2001/133538; G02F 2001/133548; G02B 5/3025; G02B 5/3058; G02C 7/12
See application file for complete search history.

(56) References Cited

U.S. PATENT DOCUMENTS 6,175,398 B1 * 1/2001 Yamada ............... G02B 5/3016
349/165
7,705,935 B2 * 4/2010 Gaudreau .............. G02B 27/26
349/1

(Continued)

FOREIGN PATENT DOCUMENTS

CN 101055329 A 10/2007
CN 201477327 U 5/2010
(Continued)

OTHER PUBLICATIONS

Chinese Patent Certificate dated Oct. 11, 2015; 201310139821.9.
(Continued)

Primary Examiner — Paisley L Arendt
(74) Attorney, Agent, or Firm — Ladas & Parry LLP

(57) ABSTRACT

A liquid crystal display includes a liquid crystal display panel including a thin film transistor (TFT) array substrate, an opposed substrate, and a liquid crystal layer between the TFT array substrate and the opposed substrate. A lower polarizer is disposed on a side of the TFT array substrate facing away from the liquid crystal layer, and the opposed substrate is provided with a polarization analyzer. The polarization analyzer includes a plurality of polarization regions and a plurality of non-polarization regions. A portion of the polarization analyzer corresponding to the polarization region is a polarization device, and the polarization regions and non-polarization regions are arranged alternately. The LCD can improve the security and confidenti-
(Continued)

ality of the information displayed on the LCD when a user views the information. And special eyeglasses and display apparatus are also provided.

15 Claims, 4 Drawing Sheets

(51) Int. Cl.
  *G02B 27/28* (2006.01)
  *G02F 1/1343* (2006.01)
  *G02F 1/1368* (2006.01)
  *G02F 1/137* (2006.01)
  *G06F 21/84* (2013.01)
  *G02C 7/12* (2006.01)
(52) U.S. Cl.
  CPC ............ *G02F 1/137* (2013.01); *G02F 1/1368* (2013.01); *G02F 1/13439* (2013.01); *G02F 1/133533* (2013.01); *G06F 21/84* (2013.01); *G02C 7/12* (2013.01); *G02F 2001/133538* (2013.01); *G02F 2001/133548* (2013.01)

(56) References Cited

U.S. PATENT DOCUMENTS

| 8,174,645 B2* | 5/2012 | Kim ................... G02F 1/133528 |
| | | 349/15 |
| 8,208,095 B2* | 6/2012 | Rho ....................... B82Y 20/00 |
| | | 349/187 |
| 2007/0242352 A1 | 10/2007 | MacMaster |

FOREIGN PATENT DOCUMENTS

| CN | 102360136 A | 2/2012 |
| CN | 102879848 A1 | 1/2013 |
| CN | 103235441 A | 8/2013 |
| JP | 2009-104074 A | 5/2009 |
| KR | 1020070046240 A | 5/2007 |
| WO | 2009134269 A1 | 11/2009 |

OTHER PUBLICATIONS

International Preliminary Report on Patentability issued Oct. 27, 2015; PCT/CN2013/082023.
International Search Report for International Application No. PCT/CN2013/082023, 15pgs.

\* cited by examiner

LIQUID CRYSTAL DISPLAY HAVING POLARIZATION DEVICE, EYEGLASSES AND DISPLAY APPARATUS

CROSS REFERENCE TO RELATED APPLICATIONS

This application is based on International Application No. PCT/CN2013/082023 filed on Aug. 22, 2013, which claims priority to Chinese National Application No. 201310139821.9 filed on Apr. 22, 2013, the contents of which are incorporated herein by reference.

TECHNICAL FIELD

Embodiments of the present invention relate to a liquid crystal display, special eyeglasses and display apparatus.

BACKGROUND

Liquid crystal display (LCD) becomes popular products on the market duet to its environment friendly properties of lighter and thinner design, lower power consumption and multi-functions.

In the technical field of LCD, since normal viewing region of the LCD is restricted solely to a narrow front view, those viewers at further left or right side of the display cannot see the displayed information on the LCD clearly or at all, which could provide certain protection for the privacy of the information shown in the LCD. But those who get confidential information from the computer intentionally or unintentionally often watch it directly behind the user or capture it with a hidden camera so as to steal the information displayed on the LCD. The peeper may have a clear view of the information displayed on the LCD from a certain angle without any awareness from the user.

SUMMARY

Embodiments of the present invention provide a liquid crystal display, special eyeglasses and display apparatus, which can improve the security and confidentiality of the information displayed on a display when a user views it.

In one aspect of the present invention, a liquid crystal display panel including a thin film transistor (TFT) array substrate, an opposed substrate, and a liquid crystal layer between the TFT array substrate and the opposed substrate. A lower polarizer is disposed on a side of the TFT array substrate facing away from the liquid crystal layer, and the opposed substrate is provided with a polarization analyzer. The polarization analyzer includes a plurality of polarization regions and a plurality of non-polarization regions. A portion of the polarization analyzer corresponding to the polarization region is a polarization device, and the polarization regions and non-polarization regions are arranged alternately.

In an embodiment of the present invention, the polarization region projected on the opposed substrate has a stripe shape, the non-polarization region projected on the opposed substrate has a stripe shape, and the polarization regions and non-polarization regions are arranged alternately along a column direction or a row direction of pixel units in the liquid crystal display panel.

In an embodiment of the present invention, the polarization device is a nano wire line polarizer.

In an embodiment of the present invention, the polarization region projected on the opposed substrate has a rect-angular shape, the non-polarization region projected on the opposed substrate has a rectangular shape, and the polarization regions and non-polarization regions are arranged alternately along a column direction and a row direction of pixel units in the liquid crystal display panel.

In an embodiment of the present invention, the polarization device comprises the polarization device comprises a first transparent electrode layer, a polarization layer having liquid crystal molecules and dichroism dye molecules; and a second transparent electrode layer arranged in the above order. The first transparent electrode layer is parallel to the opposed substrate. When no voltage is applied to the first transparent electrode layer and the second transparent electrode layer, both the liquid crystal molecules and the dichroism dye molecules in the polarization layer are oriented in parallel to the opposed substrate. When a voltage is applied to the first transparent electrode layer and the second transparent electrode layer, both the liquid crystal molecules and the dichroism dye molecules in the polarization layer are oriented in an electric field direction.

In an embodiment of the present invention, the dichroism dye molecules in the polarization layer has a content of about 1-2 wt. %.

In an embodiment of the present invention, the polarization analyzer is disposed on a side of the opposed substrate facing away from the liquid crystal layer, or on a side of the opposed substrate facing the liquid crystal layer.

In an embodiment of the present invention, the pixel units corresponding to the polarization regions in the panel are in a normal white mode; and the pixel units corresponding to the non-polarization regions in the panel are in a normal black mode. Alternatively, the pixel units corresponding to the polarization regions in the panel are in a normal black mode; and the pixel units corresponding to the non-polarization regions in the panel are in a normal white mode.

In another aspect of the present invention, special eyeglasses for the liquid crystal display described as above comprise at least one lens with a polarizer.

In yet another aspect of the present invention, a display apparatus comprises a liquid crystal display provided in any of the above technical solutions and the eyeglasses as provided in above technical solutions Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

Embodiments of the liquid crystal display device, special eyeglasses and display apparatus according to the present invention will be described in detail hereinafter in conjunction with accompanying drawings in which.

DETAILED DESCRIPTION OF THE PREFERRED EMBODIMENTS

Technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments and variants can be obtained by those of ordinary skill in the art without creative labor and those embodiments and variants shall fall into the protection scope of the present invention.

Figure 1:
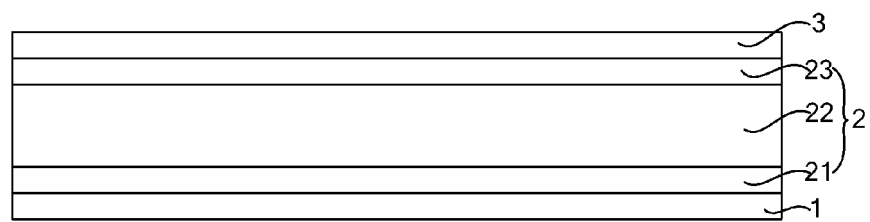
FIG. 1 is a structural schematic view of a LCD according to an embodiment of the present invention.

Referring to FIG. 1, liquid crystal display according to an embodiment of the present invention includes a liquid crystal display panel 2. The liquid crystal display panel 2 has a TFT array substrate 21, an opposed substrate 23 and a liquid crystal layer 22 between the TFT array substrate 21 and the opposed substrate 23. A lower polarizer 1 is disposed on a side of the TFT array substrate 21 facing away from the liquid crystal layer 22, and a polarization analyzer 3 is disposed on a side of the opposed substrate 23 facing away from the liquid crystal layer 22.

Figure 2:
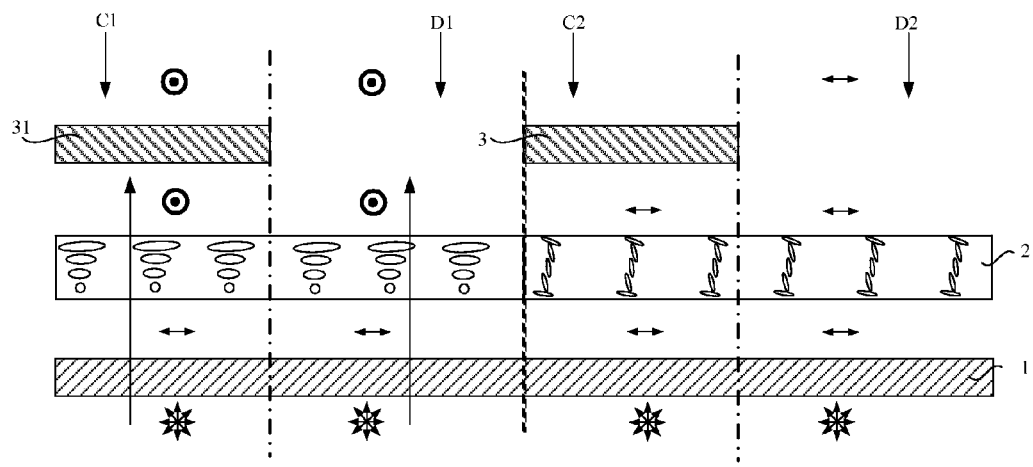
FIG. 2 is a schematic view showing display principle of a LCD according to an embodiment of the present invention.
Figure 3:
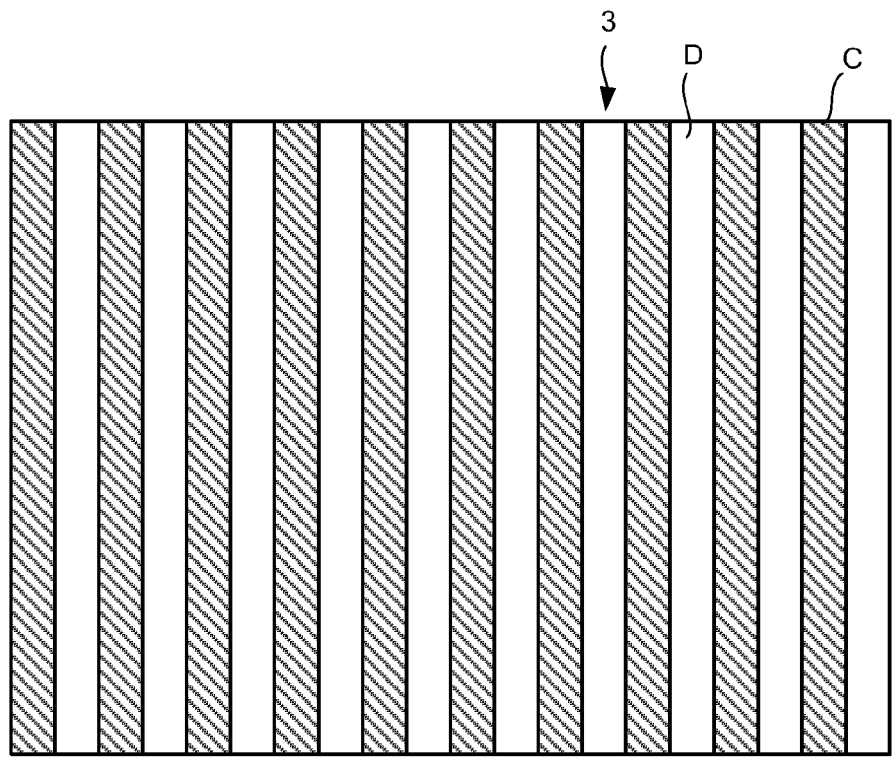
FIG. 3 is a structural schematic view of polarization regions and non-polarization regions arranged alternately in columns in a polarization analyzer of LCD according to an embodiment of the present invention.

FIG. 2 is a schematic view showing display principle of a liquid crystal display according to an embodiment of the present invention, and FIG. 3 is a structural schematic view of polarization regions and non-polarization regions arranged alternately in columns in a polarization analyzer of the LCD. The polarization analyzer 3 includes a plurality of polarization regions C and a plurality of non-polarization regions D, and a portion of the polarization analyzer 3 corresponding to the polarization region C is designated as polarization device 31. The polarization regions C and non-polarization regions D are arranged alternately.

To help the description of display principle of the LCD as described above, a special eyeglasses adapted for the LCD is introduced in the following description of the LCD, and thereafter, no separate description of operation principle of eyeglasses will be made any more.

The special eyeglasses in embodiment(s) of the present invention include at least one lens with a polarizer, for example.

In combination of the LCD and the special eyeglasses therefor provided in the technical solution as described above, the polarization analyzer 3 disposed in the opposed substrate 23 includes polarization regions C and non-polarization regions D arranged alternately. The polarization device 31 in the polarization region C can cooperate with the lower polarizer 1 in the TFT array substrate 21, so as to function as an analyzing means and a polarizing means, respectively. But there is no polarization device 31 in the non-polarization region D, so that all light rays transmitted through the liquid crystal layer can emit out of the liquid crystal display panel. As shown in FIG. 2, in the polarization regions C1 and C2, the polarization device 31 can act as a polarization analyzer, and in the non-polarization regions D1 and D2, the polarization device 31 cannot act as a polarization analyzer. As such, the viewer can see the information displayed in the pixel units corresponding to the polarization region C by nakedeyes. Since there is no polarization device 31 in the non-polarization region D, the viewer cannot identify the information displayed in the pixel units corresponding to the non-polarization region D by nakedeyes. In order to identify the displayed information in the pixel units corresponding to the non-polarization region D, the user need wear a special eyeglasses having a lens with a polarizer. When the polarizer of the lens of the eyeglasses has a light transmission axis satisfying a certain inclination angle with respect to a light transmission axis of the lower polarizer 1, the polarizer of the lens of the special eyeglasses and the lower polarizer 1 can cooperate to function as polarizing and analyzing means, respectively. Thus the user using this eyeglasses can identify the information displayed in the pixel units corresponding to the non-polarization region D.

For the LCD provided in the embodiment(s) of the present invention, the user using the special eyeglasses can see the information displayed in the pixel units corresponding to the non-polarization region D, while the user with nakedeyes can only identify the information displayed in the pixel units corresponding to the polarization region C. As such, when the display is used by a user, by introducing independent data streams to the pixel units corresponding to the polarization region C and the pixel units corresponding to the non-polarization region D respectively, it is possible to allow the information displayed in the pixel units corresponding to the polarization region C to be independent from the information displayed in the pixel units corresponding to the non-polarization region D. For example, the information displayed in the pixel units corresponding to the non-polarization D is confidential information. As such, even if a viewer is able to take a look at the information, such viewer cannot identify the information displayed in the pixel units corresponding to the non-polarization D. In such a way, the confidentiality and security of the information displayed on the LCD can be improved.

Figure 4:
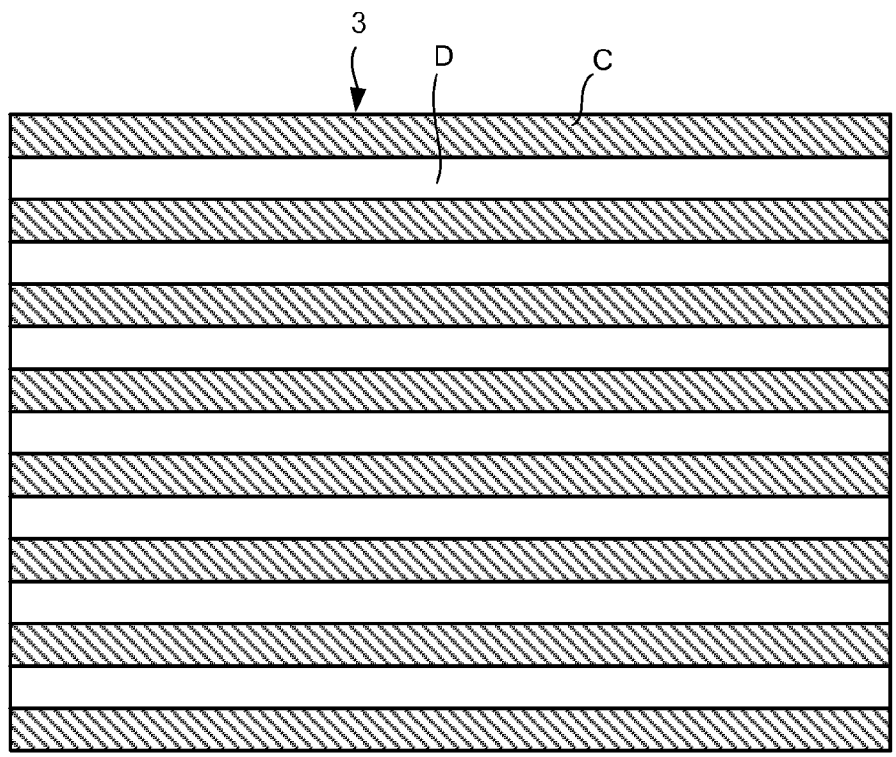
FIG. 4 is a structural schematic view of polarization regions and non-polarization regions arranged alternately in rows in a polarization analyzer of the LCD according to another embodiment of the present invention.

FIG. 4 is a structural schematic view of polarization regions and non-polarization regions arranged alternately in rows in a polarization analyzer of the LCD according to an embodiment of the present invention. As shown in FIGS. 3 and 4, in an implementation, each polarization region C projected on the opposed substrate 23 has a stripe shape, each non-polarization region D projected on the opposed substrate 23 also has a stripe shape, and the polarization regions C and non-polarization regions D are arranged alternately along a column direction or a row direction of pixel units in the liquid crystal display panel 2. That is, the polarization regions C and the non-polarization regions D in the polarization analyzer 3 are arranged in alternate columns or in alternate rows.

Figure 5:
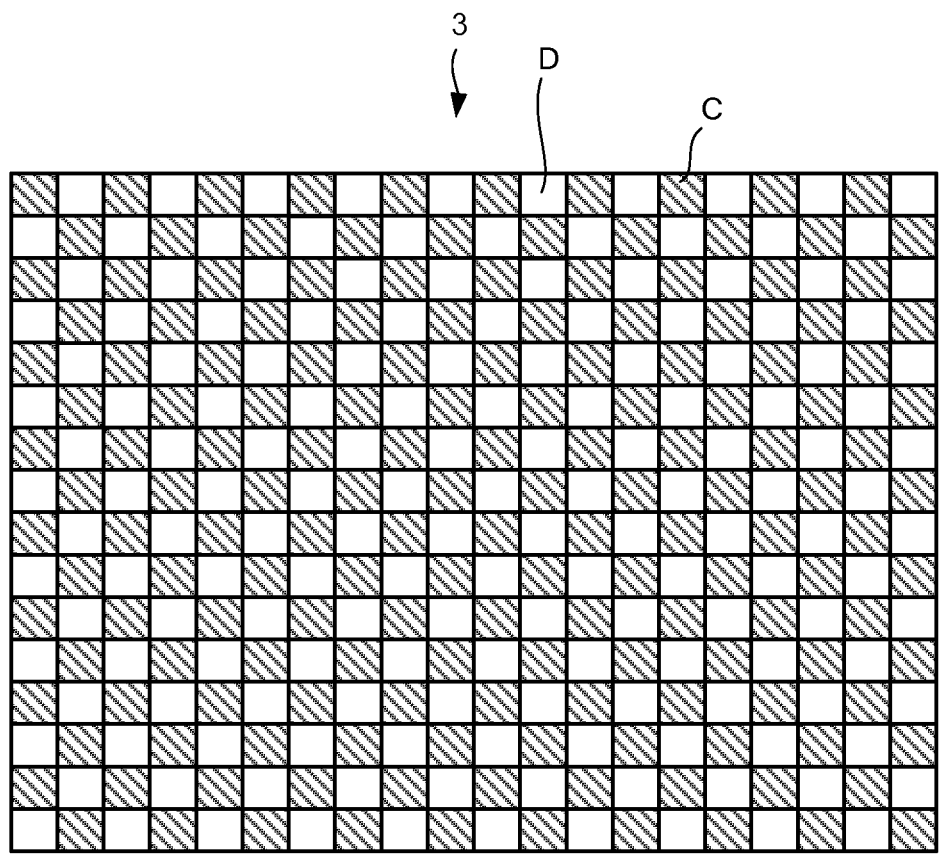
FIG. 5 is a structural schematic view of polarization regions and non-polarization regions arranged alternately in grids in a polarization analyzer of LCD according to yet another embodiment of the present invention.

As shown in FIG. 5, in another implementation of the polarization analyzer 3, each polarization region C projected on the opposed substrate 23 has a rectangular shape, each non-polarization regions D projected on the opposed substrate 23 has a rectangular shape, and both the polarization regions C and non-polarization regions D are arranged alternately along both column direction and row direction of the pixel units in the LCD panel 2. That is, the polarization regions C and non-polarization regions D in the polarization analyzer 3 are arranged in a grid.

Figure 6:
FIG. 6 is a structural schematic view of a polarization analyzer of LCD in which the polarization device is a wire line polarizer according to an embodiment of the present invention.

As shown in FIG. 6, when the polarization regions C and the non-polarization regions D in the polarization analyzer 3 are arranged in alternate columns or alternate rows, the polarization device 31 in the polarization region C whose projection on the opposed substrate 23 has a stripe shape, may be a nano wire line polarizer (WLP).

Figure 7:
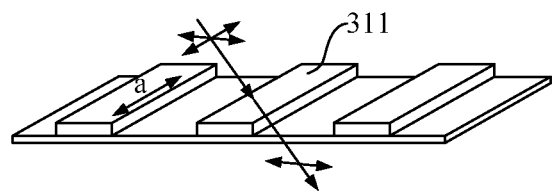
FIG. 7 is a schematic view showing polarization principle of the wire line polarizer shown in FIG. 6.

As shown in FIG. 7, a nano wire line polarizer can reflect the polarized light vibrating along an extending direction a of nano metal lines 311 in the WLP, while it can transmit the polarized light vibrating along a direction perpendicular to the extending direction a of nano metal lines 311 in the WLP, so as to achieve selective transmission of the polarized light to function as a polarizer.

The operation principle of the wire line polarizer is described with reference to FIG. 7. Light is an electromagnetic wave with an alternate propagation of the electric field and magnetic field, and the direction of the electric field and the direction of the magnetic field are perpendicular to each other. When the electric vector direction in the electromagnetic wave is parallel to the extending direction a of the metal lines 311, the light whose electric field is parallel to the extending direction a of metal lines 311 induces the vibration of the electrons in the metal lines 311, so that the electric vector of the electromagnetic wave excites electric current in the metal lines 311. Since the energy of the electric current is transformed into thermal energy, there is no electromagnetic wave propagating through the wire line polarizer. When the electric vector direction is perpendicular to the extending direction a, no current is excited in the metal lines 311 by the electromagnetic wave, thus this portion of the electromagnetic wave can transmit through the wire line polarizer. Based on this principle, the above described wire line polarizer can function as a polarization analyzer.

For a nano metal polarizer, it can be patterned as required by the present invention. The patterned region with polarization regions and non-polarization regions can be formed by a conventional metal depositing process such as sputtering, a spin coating of photoresist, a mask developing, a metal etching process (e.g., wet etching), a photoresist stripping process and so on.

It is understood that the polarization device 31 in the polarization analyzer 3 can also have a common polarizer structure including two support protective layers and a polarization layer between the two support protective layers. The polarization layer is polyvinyl alcohol (PVA) film, for example, and the material of the support protective layers can be triallyl cyanurate or triacetyl cellulose, for example.

Figure 8:
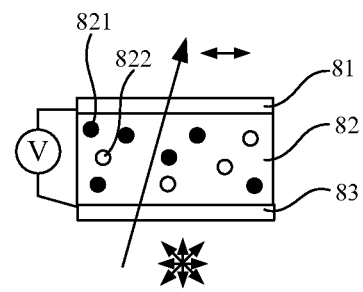
FIG. 8 illustrates the principle of light transmission in a state where a portion of the polarization layer corresponding to the polarization region has liquid crystal material and dichroism dye material and no voltage is applied to the first transparent electrode layer and the second transparent electrode layer.

Referring to FIG. 8, when the polarization regions C and the non-polarization regions D of the polarization analyzer 3 are arranged in alternate rows, in alternate columns, or in grid, the polarization device 31 in the polarization analyzer 3 can include a first transparent electrode layer 81; a polarization layer 82 including liquid crystal molecules 821 and dichroism dye molecules 822; and a second transparent electrode layer 83 arranged in the above order. The first transparent electrode layer 81 and the second transparent electrode layer 83 are parallel to the opposed substrate 23. When no voltage is applied to the first transparent electrode layer 81 and the second transparent electrode layer 83, both the liquid crystal molecules 821 and the dichroism dye molecules 822 in the polarization layer are oriented in parallel to the opposed substrate 23. When a voltage is applied to the first transparent electrode layer 81 and the second transparent electrode layer 83, both the liquid crystal molecules 821 and the dichroism dye molecules 822 in the polarization layer 82 are oriented in the direction of the electric field.

The dichroism dye molecules 822 is mainly for selectively absorbing the polarizing light (acting as a polarizer), and deflect with the polarizing of the liquid crystal molecules 821. The liquid crystal molecules 821 can be deflected by the electric field, which can control the direction change of the polarization state of the incident light, and cooperate with the polarizer to display properly.

The dichroism dye molecules 822 have different light absorptivities along the long axis direction and short axis direction. For example, as shown in FIG. 8, when no voltage is applied to the first transparent electrode layer 81 and the second transparent electrode layer 83, both the liquid crystal molecules 821 and the dichroism dye molecules 822 in the polarization layer 82 are oriented horizontally (i.e., in a direction parallel to the first transparent electrode layer 81 or the second transparent electrode layer 83). That is, the long axis of the dichroism dye molecules 822 and the liquid crystal molecules 821 is oriented in a horizontal direction, while the short axis of the dichroism dye molecules 822 is oriented in a vertical direction (i.e., in a direction perpendicular to the first transparent electrode layer 81 or the second transparent electrode layer 83). In this case, the polarization layer 82 can absorb the polarization light parallel to its orientation and transmit the polarization light perpendicular to its orientation, thus acting as a polarizer.

According to embodiment(s) of the present invention, the dichroism dye molecules 822 has a content of about 1-2 wt. % in the polarization layer 82. The dichroism dye molecules 822 is mainly for selectively absorbing the polarization light (i.e., acting as a polarizer) and can deflect with the polarization of the liquid crystal molecules 821.

Figure 9:
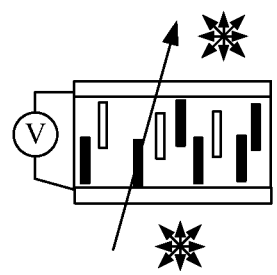
FIG. 9 illustrates the principle of light transmission in a state where a portion of the polarization layer corresponding to the non-polarization region has a liquid crystal material and dichroism dye material and a voltage is applied to the first transparent electrode layer and the second transparent electrode layer

As shown in FIG. 9, in order to facilitate the preparation of the polarization analyzer 3, the non-polarization region D of the polarization analyzer 3 also includes two transparent electrode layers and a polarization layer having the liquid crystal molecules 821 and dichroism dye molecules 822 disposed between the two transparent electrode layers. When no voltage is applied to the two transparent electrode layers, both the liquid crystal molecules 821 and dichroism dye molecules 822 in the polarization layer can be oriented horizontally. When a voltage is applied to the two transparent electrode layers, both the liquid crystal molecules 821 and dichroism dye molecules 822 in the polarization layer can be oriented along the direction of the electric field so as to be perpendicular to the first and second transparent electrode layers. When a voltage is applied to the two transparent electrode layers in the non-polarization regions D, no polarization analyzing effect is obtained for the portion of the polarization device 3 corresponding to non-polarization region D.

The polarization regions C and the non-polarization regions D in the polarization analyzer 3 have the same structure so as to facilitate the preparation of the polarization analyzer 3 as a whole. The transparent electrode layers in the polarization regions C and the non-polarization regions D can be controlled independently to enabling applying the voltage independently. For example, independent switch control signals are used for different regions to change the polarization state. For example, if the locations of the polarization regions C and the non-polarization regions D are designated to fixed areas, the independent control can be carried out in a simple passive mode (e.g., using two switch control signals); if the polarization regions and the non-polarizations are set in various ways, the control can be performed in a active mode using TFT.

When the polarization regions C and the non-polarization regions D are arranged in alternate columns, alternate rows, or a grid in the polarization analyzer 3, the polarization device 31 of the polarization analyzer 3 includes two support protective layers and a polarization layer disposed between the two support protective layers according to one embodiment of the present invention.

According to embodiment(s) of the present invention, the polarization layer described in above embodiment(s) can be polyvinyl alcohol (PVA) film, for example; and the material of the support protective layers can be triallyl cyanurate or triacetyl cellulose, for example.

When the polarization device 31 as described above is a conventional polarizer including two support protective layers and a PVA polarizer structure disposed between the two support protective layers, dry etch can be performed for the whole polarizer by using a plasma or a laser etching with a mask so as to form the whole polarization analyzer 3 having polarization regions C and non-polarization regions D.

According to embodiment(s) of the present invention, the conventional polarizer used in the polarization device 31 can be prepared according to a preparation method for a polarizer, or formed directly on the opposed substrate 23 by using the opposed substrate as a base substrate.

The patterning of the whole polarizer includes patterning the polarization layer in the polarizer, and the support protective layers on the upper and lower side of the polarization layer can keep stretching direction of the polarization layer, while avoid moisture lost of the polarizer in the polarization layer.

In order to keep good contact between the polarizer and the opposed substrate 23, an adhesive layer can be applied to the polarizer and the opposed substrate 23.

The patterning process of the polarizer can be as following: forming an adhesive layer, a support protective layer, and a polarization layer sequentially on the opposed substrate 23; patterning the polarization layer by a plasma or a laser etching with a designed mask, aligning mark(s) on the mask and the LCD panel, so that the patterns on the mask have a one on one correspondence to the pixel units which correspond to the non-polarization regions on the TFT array substrate.

An additional support protective layer is formed on the patterned polarization layer so as to further secure the patterning shape of the etched polarization layer and keep the moisture content in the polarization layer.

An additional surface protective layer can be made on the outer support protective layer in order to protect the polarizer better and avoid the polarizer from scratching.

Iodine is added in the polarization layer, and the iodine molecules in the polarization layer is oriented by adsorption in the same direction as an extending direction of the polyvinyl alcohol film extended uniaxially, so as to obtain a polarization functionality.

The two support protective layers are disposed on the two sides of the polarization layer respectively so as to improve the reliability of the polarization layer.

The outer protective layer should have characteristics of good appearance, anti-static, and no optical defects in order to protect the polarizer from being damaged by environment. For example, a PET film can be used.

The polarizer with the above structure can also be patterned by dot printing, transfer and the like.

In the embodiment(s) and examples described as above, the polarization analyzer 3 can be disposed on a side of the opposed substrate 23 facing away from the liquid crystal layer 22, or on a side of the opposed substrate 23 facing the liquid crystal layer 22, as long as it can act as a polarization analyzer for the pixel units corresponding to the polarization regions C.

In the above embodiment(s), the pixel units corresponding to the polarization regions C in the LCD panel 2 can be set in a normal white mode; and the pixel units corresponding to the non-polarization regions D can be set in a normal black mode. Alternatively, the pixel units corresponding to the polarization regions C can be set in a normal black mode; and the pixel units corresponding to the non-polarization regions D can be set in a normal white mode. As such, as long as the transmission axis of the polarizer on the lens of the specific eyeglasses is perpendicular to the transmission axis of the polarization device 31 in the polarization analyzer 3, the information displayed in the pixel units corresponding to the polarization regions C and the information displayed in the pixel units corresponding to the non-polarization regions D can be separated, so as to avoid the interference.

According to embodiment(s) of the present invention, the normal black mode and normal white mode are normal black mode and normal white mode in TN mode.

When the polarization regions C and non-polarizations D in the polarization analyzer 3 are arranged in alternate columns or alternate rows, the pixel units corresponding to the polarization regions C is in a normal white mode in TN mode, and the pixel units corresponding to the non-polarization regions D is in a normal black mode in TN mode. When the polarization device 31 includes a nano WLP wire line polarizer, the extending direction of the metal lines in the wire line polarizer is perpendicular to the transmission axis of the lower polarizer 1.

The LCD provided in above embodiments can be applied in 3D display technical field by introducing different data streams to the pixel units corresponding to the polarization regions C and the pixel units corresponding to the non-polarizations D. The polarization region C and the non-polarization D can occupy the same area or different areas, but both occupy the same area preferably in 3D applications.

The opposed substrate 23 provided in technical solutions described as above can be a color filter substrate.

The above described display can also be in a color filter on array (COA) mode, in which the color filter layer is formed on the TFT array substrate 21. In such case, the opposed substrate 23 may have no color filter layer.

Special eyeglasses for the liquid crystal display according to the above described implementations and embodiments includes at least one lens with a polarizer. When a user wears the special eyeglasses having the lens with the polarizer, if the light transmission axis of the polarizer of the lens of the eyeglasses and the light transmission axis of the lower polarizer 1 satisfy certain inclination angles therebetween, the polarizer on the lens of the eyeglasses and the lower polarizer 1 can cooperate to function as a polarizing means and a polarization analyzing means respectively, which in turn enables identifying the information displayed in the pixel units corresponding to the non-polarization region D.

The embodiment(s) of the present invention also provide(s) a display apparatus including a liquid crystal display and special eyeglasses according to above described embodiment(s) and implementation(s).

In combination of the LCD and its special eyeglasses provided in above described technical solutions, in the LCD of the present invention, the polarization analyzer disposed on the opposed substrate includes polarization regions and non-polarization regions arranged alternately. The polarization device in the polarization region can cooperate with the lower polarizer on the TFT array substrate to act as the polarizing and polarization analyzing means, so that the viewer can see the information displayed in the pixel units corresponding to the polarization regions by nakedeyes, but the viewer cannot see the information displayed in the pixel units corresponding to the non-polarization regions by nakedeyes, since there is no polarization device in the non-polarization regions. In order to identify the displayed information in the pixel units corresponding to the non-polarization regions, the user has to wear a special eyeglasses having a lens with a polarizer, so that when the light transmission axis of the polarizer of the lens of the eyeglasses and the light transmission axis of the lower polarizer satisfy a certain inclination angle therebetween, the polarizer on the lens of the eyeglasses and the lower polarizer can cooperate to function as the polarizing means and the polarization analyzing means respectively.

For the LCD provided in the embodiment(s) of the present invention, a viewer using the special eyeglasses can view the information displayed in the pixel units corresponding to the non-polarization regions, while the viewer with nakedeyes can only see the information displayed in the pixel units corresponding to the polarization regions. As such, when a user uses the display, even if a peeper can see the display, the peeper cannot identify the information displayed in the pixel units corresponding to the non-polarization regions so that the confidentiality and security of the information displayed on the LCD can be improved.

It will be obvious that the embodiments of the present invention can be modified or varied in many ways by the skilled in the art without departure from the spirit and scope of the invention, and all such modifications and variants and the equivalents thereof are intended to fall into the scope of the appended claims.

What is claimed is:

1. A liquid crystal display, comprising:
a liquid crystal display panel including a thin film transistor (TFT) array substrate,
an opposed substrate, and
a liquid crystal layer between the TFT array substrate and the opposed substrate;
wherein a lower polarizer is disposed on a side of the TFT array substrate facing away from the liquid crystal layer, and the opposed substrate is provided with a polarization analyzer, and the polarization analyzer includes a plurality of polarization regions and a plurality of non-polarization regions,
a polarization device is formed by a portion of the polarization analyzer corresponding to the polarization regions,
wherein the polarization regions and non-polarization regions are arranged alternately,
both of portions of the lower polarizer corresponding to the polarization regions and portions of the lower polarizer corresponding to the non-polarization regions polarize light, and light emitted from the non-polarization regions is analyzed by eyeglasses in which a polarizing axis is perpendicular to a polarizing axis of the polarization device, so that a user of the eyeglasses identifies information displayed in the non-polarization regions.

2. The liquid crystal display according to claim 1, wherein each of the polarization regions projected on the opposed substrate has a stripe shape, each of the non-polarization regions projected on the opposed substrate has a stripe shape, and the polarization regions and non-polarization regions are arranged alternately along a column direction or a row direction of pixel units in the liquid crystal display panel.

3. The liquid crystal display according to claim 2, wherein each polarization device comprises a first transparent electrode layer, a polarization layer having liquid crystal molecules and dichroism dye molecules; and a second transparent electrode layer arranged in the above order;
wherein the first transparent electrode layer is parallel to the opposed substrate;
when no voltage is applied to the first transparent electrode layer and the second transparent electrode layer, both the liquid crystal molecules and the dichroism dye molecules in the polarization layer are oriented in parallel to the opposed substrate;
when a voltage is applied to the first transparent electrode layer and the second transparent electrode layer, both the liquid crystal molecules and the dichroism dye molecules in the polarization layer are oriented in an electric field direction.

4. The liquid crystal display according to claim 3, wherein the polarization analyzer is disposed on a side of the opposed substrate facing away from the liquid crystal layer, or on a side of the opposed substrate facing the liquid crystal layer.

5. The liquid crystal display according to claim 4, wherein the dichroism dye molecules in the polarization layer have a content of about 1-2 wt. %.

6. The liquid crystal display according to claim 3, wherein the dichroism dye molecules in the polarization layer has a content of about 1-2 wt. %.

7. The liquid crystal display according to claim 2, wherein the pixel units corresponding to the polarization regions in the panel are in a normal white mode; and the pixel units corresponding to the non-polarization regions in the panel are in a normal black mode; or
the pixel units corresponding to the polarization regions in the panel are in a normal black mode; and the pixel units corresponding to the non-polarization regions in the panel are in a normal white mode.

8. The liquid crystal display according to claim 7, wherein the polarization analyzer is disposed on a side of the opposed substrate facing away from the liquid crystal layer, or on a side of the opposed substrate facing the liquid crystal layer.

9. The liquid crystal display according to claim 2, wherein the polarization device is a nano wire line polarizer.

10. The liquid crystal display according to claim 1, wherein the polarization device is a nano wireline polarizer.

11. The liquid crystal display according to claim 10, wherein each of the polarization regions projected on the opposed substrate has a rectangular shape, each of the non-polarization regions projected on the opposed substrate has a rectangular shape, and the polarization regions and non-polarization regions are arranged alternately along a column direction and a row direction of pixel units in the liquid crystal display panel.

12. The liquid crystal display according to claim 10, wherein pixel units corresponding to the polarization regions in the panel are in a normal white mode; and pixel units corresponding to the non-polarization regions in the panel are in a normal black mode; or
    pixel units corresponding to the polarization regions in the panel are in a normal black mode; and pixel units corresponding to the non-polarization regions in the panel are in a normal white mode.

13. The liquid crystal display according to claim 1, wherein each of the polarization regions projected on the opposed substrate has a rectangular shape, each of the non-polarization regions projected on the opposed substrate has a rectangular shape, and the polarization regions and non-polarization regions are arranged alternately along a column direction and a row direction of pixel unit's in the liquid crystal display panel.

14. The liquid crystal display according to claim 1, wherein the polarization device comprises a first transparent electrode layer; a polarization layer including liquid crystal molecules and dichroism dye molecules; and a second transparent electrode layer.

15. A display apparatus, comprising a liquid crystal display and eyeglasses,
    wherein the liquid crystal display panel includes a thin film transistor (TFT) array substrate, an opposed substrate, and a liquid crystal layer between the TFT array substrate and the opposed substrate;
    a lower polarizer is disposed on a side of the TFT array substrate facing away from the liquid crystal layer,
    the opposed substrate is provided with a polarization analyzer, the polarization analyzer includes
        a plurality of polarization regions and a plurality of non-polarization regions,
        a polarization device is formed by a portion of the polarization analyzer corresponding to the polarization regions,
        wherein the polarization regions and non-polarization regions are arranged alternately, and
    both of portions of the lower polarizer corresponding to the polarization regions and portions of the lower polarizer corresponding to the non-polarization regions polarize light; and
    wherein the eyeglasses comprise at least one lens with a polarizer, and the polarizer has a polarizing axis perpendicular to a polarizing axis of the polarization device, and light emitted from the non-polarization regions is analyzed by the eyeglasses, so that a user of the eyeglasses identifies information displayed in the non-polarization regions.

* * * * *